N. V. HYBINETTE.
PROCESS OF PRODUCING COPPER NICKEL ANODES.
APPLICATION FILED JUNE 26, 1913.
1,128,314. Patented Feb. 16, 1915.
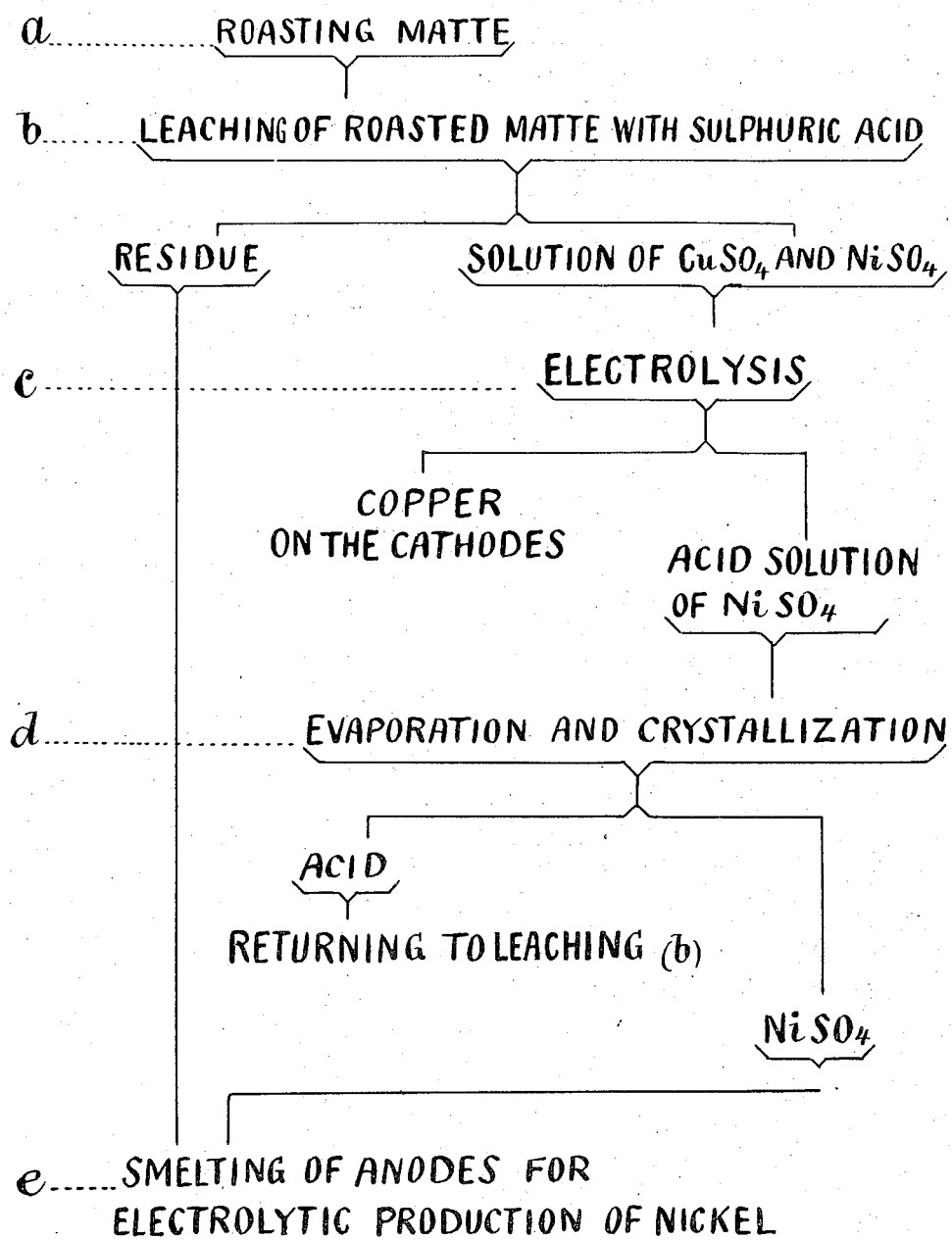

UNITED STATES PATENT OFFICE.

NOAK VICTOR HYBINETTE, OF CHRISTIANIA, NORWAY, ASSIGNOR TO PACIFIC SECURITIES COMPANY LIMITED, OF TORONTO, CANADA.

PROCESS OF PRODUCING COPPER-NICKEL ANODES.

1,128,314. Specification of Letters Patent. Patented Feb. 16, 1915.

Original application filed June 5, 1912, Serial No. 701,780. Divided and this application filed June 26, 1913. Serial No. 775,954.

*To all whom it may concern:*

Be it known that I, NOAK VICTOR HYBINETTE, a subject of the King of Norway, residing at Christiania, Norway, have invented a Process of Producing Copper-Nickel Anodes, of which the following is a specification, and is a division of my application, Serial No. 701,780, filed June 5, 1912.

This invention has for its object a process of separating copper from nickel.

In a patent granted to me in U. S. A. November 28th 1905 under No. 805,969, I describe a process of refining copper-nickel matte. The matte is first roasted and if the proportion of copper is large the roasted material is leached with sulfuric acid whereby a residue after leaching is obtained which contains copper and nickel in the ratio of about one to four. This material is then smelted to anodes for electrolysis. The solution from such leaching contains mainly copper but some nickel is also dissolved.

The object of this invention is to provide a certain way of carrying out this leaching and handling the resulting solution which fits in with the main process better than any other way.

In the accompanying drawing, I have diagrammatically illustrated my improved process.

The process consists in that the roasted material is placed in a leaching tank and leached with an acid solution of copper sulfate and nickel sulfate. This solution is partly neutralized by this leaching and its contents of copper and nickel is increased. It is however not allowed to remain so long in contact with the roasted material that all acid is neutralized. It is then electrolyzed in electrolytic cells having insoluble anodes preferably of lead. This electrolyzing is not allowed to go on until all copper is plated out, but only a small portion is removed equal to the amount introduced by the leaching. In this way the leaching and electrolysis goes on with a fairly constant composition of solution. The nickel contents is however increasing and is allowed to increase until nearly the point where nickel sulfate begins to crystallize. A small part of solution is then taken away and electrolyzed until nearly all copper is removed. It is then crystallized whereby impure copper nickel crystals are obtained. The mother liquor from the crystallization is returned to the main circulating body of solution with enough water and new acid added to make up for the loss represented by the impure crystals. These impure crystals are united with the leached matte and smelted into anodes directly or the crystals may first be roasted.

In the drawing I have represented the various steps diagrammatically by the reference characters $a$, $b$, $c$, $d$, $e$, and have also indicated the products of the steps which involve chemical action.

What I claim is:—

The herein described process of producing copper nickel anodes for electrolytic separation comparatively low in copper from matte and other products comparatively high in copper consisting in roasting the matte and leaching the resulting oxids with diluted sulfuric acid electrolyzing the resulting acid solution for recovery of copper and crystallizing the solution for removal of nickel in the form of impure sulfate crystals, thereby regenerating the solution and uniting the impure nickel sulfate crystals with the residue from leaching, smelting the mixture and casting anodes substantially as described.

Signed at London, England, this 9th day of June 1913.

NOAK VICTOR HYBINETTE.

Witnesses:
H. D. JAMESON,
O. J. WORTH.